United States Patent

Dickopp et al.

[15] 3,652,809

[45] Mar. 28, 1972

[54] SYSTEM FOR REPRODUCING MECHANICALLY STORED SIGNALS INCLUDING CARRIER HAVING DEFORMABLE MEANS COACTING WITH PRESSURE-SENSITIVE PICKUP MEANS

[72] Inventors: Gerhard Dickopp; Hans-Joachim Klemp; Horst Redlich; Eduard Schuller, all of Berlin, Germany

[73] Assignees: Telefunken G.m.b.H., Berlin; Teldec Telefunken-Decca Schallplatten G.m.b.H., Hamburg, Germany

[22] Filed: Feb. 12, 1969

[21] Appl. No.: 798,709

[30] Foreign Application Priority Data

Feb. 13, 1968 Germany ......................P 15 74 489.5

[52] U.S. Cl. ...........179/100.4 R, 178/6.6 A, 179/100.41 PJ, 179/100.41 P, 179/100.41 V

[51] Int. Cl. ..................G11b 3/10, H04r 15/00, H04r 17/00

[58] Field of Search................179/100.4, 100.4 C, 100.4 ST, 179/100.4 PE, 100.4 MO, 100.41 PE, 100.41 R, 100.41 MS, 100.41 T, 100.41 ST; 178/6.6 A, 6.6 B

[56] References Cited

UNITED STATES PATENTS

| | | | |
|---|---|---|---|
| 200,521 | 2/1878 | Edison | 179/100.4 X |
| 1,737,253 | 11/1929 | Linsell | 179/100.41 |
| 2,096,106 | 10/1937 | Guerbilsky | 179/100.4 |
| 2,349,886 | 5/1944 | Roberts | 179/100.4 |
| 2,488,936 | 11/1949 | Roberts | 179/100.41 X |

*Primary Examiner*—Bernard Konick
*Assistant Examiner*—Raymond F. Cardillo, Jr.
*Attorney*—Spencer & Kaye

[57] ABSTRACT

Apparatus for reproducing a mechanically recorded signal which includes a storage element and a signal pickup device. The signal is mechanically recorded on the storage element by means of a series of deformations in the surface thereof. According to the invention, the pickup device is arranged to apply a compressive force against these deformations and to sense the variations in this compressive force resulting from relative motion between the pickup device and the surface of the storage element.

25 Claims, 5 Drawing Figures

INVENTORS
Gerhard Dickopp
Hans-Joachim Klemp
Horst Redlich &
Eduard Schüller
BY Spencer & Kaye
ATTORNEYS INVENTORS
Gerhard Dickopp
Hans-Joachim Klemp
Horst Redlich &
Eduard Schüller BY Spencer & Kaye
ATTORNEYS INVENTORS
Gerhard Dickopp
Hans-Joachim Klemp
Horst Redlich &
Eduard Schüller
BY Spencer & Kaye
ATTORNEYS

SYSTEM FOR REPRODUCING MECHANICALLY STORED SIGNALS INCLUDING CARRIER HAVING DEFORMABLE MEANS COACTING WITH PRESSURE-SENSITIVE PICKUP MEANS

BACKGROUND OF THE INVENTION

The present invention relates to a system for reproducing signals which are mechanically stored on a record element having a surface with a series of deformations corresponding to the value of the signals as a function of time. The system employs a pickup device having a suitable stylus arranged to apply a compressive force against a portion of the surface of the record element and a drive mechanism to impart relative motion between the record element surface and the stylus. More particularly, the present invention relates to signal storing and reproducing apparatus in the nature of a disc phonograph or other similar mechanical recording apparatus which is suitable for storing and reproducing high-frequency signals.

Within the scope of the present invention are included a particular record element for the signal storing and reproducing system described above; a particular method of mechanically recording a signal as a function of time on this record element and a particular pickup device which may be used with this record element.

With the known prior art techniques of recording and reproducing signals which are stored as deformations in the surface of a physical body - e.g., as vertical or lateral deformations in a cut groove of a record - the mass of the part of the pickup device which is essentially rigidly connected with the pickup stylus and the mass of the stylus itself are kept sufficiently small so that, when the stylus is acted upon by the deformed surface, given the particular elasticity of the record material, the characteristic frequency of these movable members lies above the range of signal frequencies which are recorded. These movable members of the pickup are maintained in alignment with the remainder of the pickup device by a suitably elastic spring which applies a small restoring force to the movable members. This restoring force (the reciprocal value of which is the compliance of the pickup device) also affects the characteristic or resonant frequency of the movable members. The spring is normally arranged directly between the member which is rigidly coupled to and holds the pickup stylus and the pickup transducer - e.g., the piezoelectric crystal - which is used to convert kinetic energy of motion into electrical energy.

According to the well-known principles of mechanical recording, it is necessary to ensure, given particular record groove dimensions and particular radii of curvature for the pickup stylus, that the reductions in the amplitude of stylus deflection caused by the elastic and permanent deformations of the record element material remain small compared to the spatial modulations of the recording groove. Too great a reduction in the stylus deflection amplitude leads to a reduction in the signal level and to distortions in the reproduction.

From these criteria it can be seen that the elastic and permanent deformations which are suffered by record material beneath the pressure of a pickup stylus establish an upper limit in the frequency of mechanical reproduction which is determined by the dimensions of the cooperating surfaces of the pickup stylus and the record, the mechanical resistance or rigidity of the record material, the relative speed between the pickup device and the groove surface as well as by the compressive force applied against the record surface by the stylus. Given the values for these variables which are common in the phonograph or disc recording art, this frequency limit is not very much higher than the frequency range of audible sound.

The publication, "Factors Affecting the Stylus/Groove Relationship in Phonograph Playback Systems" by G. R. Bastiaans, *Journal of the Audio Engineering Society*, (October, 1967) Volume 15, No. 4, pp. 389–399, contains a detailed description of the theory of these relationships just mentioned and specifies those signal frequency limits which can not be exceeded with the conventional types of recording discs in use today. Experimental research has substantiated these theoretically obtained results.

In order to reduce the distortion-producing effects of the elasticity of the record element material, it has been suggested that very hard material - i.e., a material having a high modulus of elasticity - be employed. However, as is even noted in the above-cited article, the increase in the forces of contact between such a hard record material(such as nickel, for example) and the pickup stylus, due to the reduction in the contact area, leads to permanent deformations and thus, in turn, to a high rate of wear. Therefore, in order to reduce the deformations of the groove walls of the record and yet keep the deformations within the elastic limits of the material, it is necessary to find a hard material that exhibits a very high yield point.

To increase the usable range of frequencies, and, more particularly, to extend this range upward to include higher frequencies, the above-cited article also suggests the possibility of substantially reducing the contact force of the pickup stylus. This change is only possible if it is accompanied by a simultaneous substantial reduction in the mass of the moving members of the pickup device.

These various possibilities for improving the frequency response and range of a mechanical recording and reproducing system are all directed to techniques for minimizing the cause of distortion; namely, the elastic and permanent deformations of the record material. It is clear that some improvements can be made along these lines since, as noted above, the signal level of present-day recordings reduces to zero at a limit frequency not far above the audible range. However, any improvements in the frequency ranges which can be recorded will be simply improvements in degree, not in kind, and will be accompanied by corresponding increases in cost. In the opinion of the experts in this art, which is typified by the publication cited above, there is an upper frequency limit in the signals which can be picked up from a record by mechanical reproduction, and, since this frequency limit is determined by the unavoidable flexibility or elasticity of the record material, it can be displaced upward to some degree, but not overcome.

SUMMARY OF THE INVENTION

An object of the present, invention, therefore, is to provide a system of mechanical signal recording and reproduction having a broad, continuous range of acceptable frequency response.

More particularly, it is an object of the present invention to provide apparatus for reproducing mechanically stored signals which have a frequency far above the frequency limit of the reproducing apparatus of the prior art; i.e., far above the frequency at which the elastic deformations of the record material reduce the signal, produced by the prior art pickup devices, to zero.

This object, as well as other objects, which will become apparent in the discussion that follows, is achieved, according to the present invention, by providing the pickup device of a signal storage and reproducing system of the type described above with means to sense the variations in applied pressure, during relative motion between pickup and record element, caused by the deformations in the surface of the record element that represent the stored signals. More particularly, in contrast to the movement-dependent pickup devices of the prior art, the pickup device which forms the present invention is constructed with a transducer body which directly converts the incremental variations in the pressure applied to the "stylus" (which may include the transducer body itself) into an electrical signal.

DESCRIPTION OF THE PREFERRED EMBODIMENTS

The preferred embodiments of the present invention will now be described with reference to various figures of the drawings.

Figure 1:
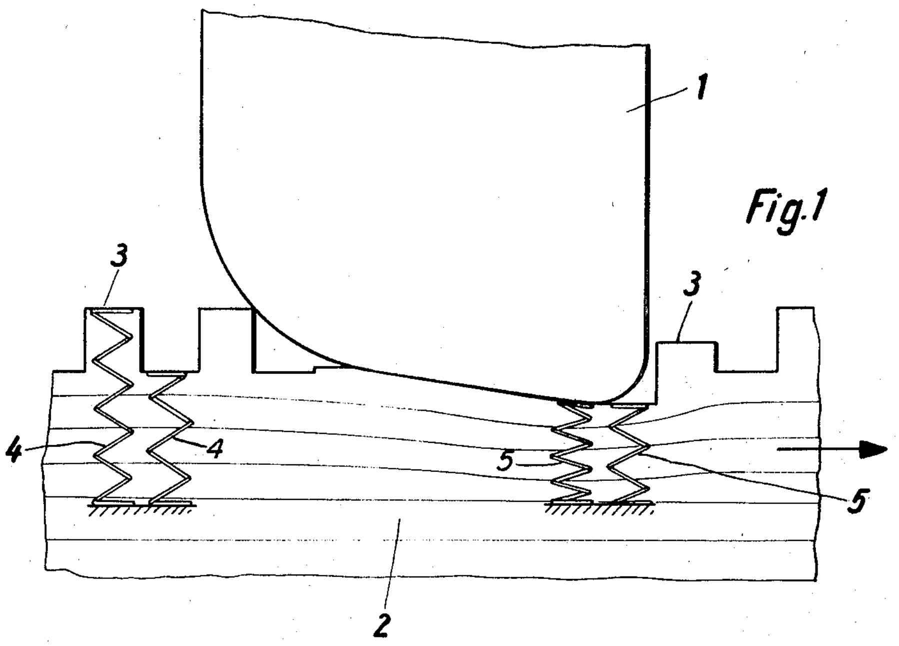
FIG. 1 is a diagram showing the principles of operation of the signal-reproducing system according to the present invention.

FIG. 1 shows the cooperating parts of the pickup stylus 1 and the record 2 in greatly enlarged view. The record 2 is moved beneath the stylus 1 in the direction indicated by the arrow. The surface of the record 2 exhibits a plurality of deformations 3 which are formed as individual elements separated one from the other by intermediate spaces or interstices. The front side of the stylus is rounded with a large radius of curvature while the rear side extends upward perpendicular to the surface of the record from a comparatively sharp edge; i.e., from a corner with a relatively small radius of curvature. It may be seen from the schematic illustration that the deformations 3 which travel beneath the surface of the pickup stylus are pressed downward and deformed within their elastic range or limits. Even the portions of the surface of the record which lie beneath the interstices experience a certain compressive force and are consequently pressed downward.

The elasticity of the record material is indicated, symbolically, in the left-hand portion of FIG. 1 by the springs 4. These springs 4 are shown in their unstressed state. The springs 5 located beneath the point of the pickup stylus represent, again symbolically, the elasticity of the record material when placed under stress. As a result of the reaction of the force of these springs 5 upon the pickup stylus, an increased compressive force will be exerted on the stylus.

It will thus be seen that the carrier, constituted in the above-described embodiment by the record 2, has deformable means by which signals are stored in mechanical form. The pressure-sensitive pickup means, such as the stylus 1, which are capable of converting changes in mechanical pressure into electrical signals have a surface portion for engaging the formable means. Thus, when relative movement of the pickup stylus is caused along the path along which the deformable means are arranged, and when the surface portion of the stylus is substantially immovable in the direction of the force action to maintain the surface portion of the stylus and the deformable means in engagement with each other, the deformable means are deformed and the stylus puts out electrical signals which correspond to the signals that are stored in mechanical form. In FIG. 1, the drive mechanism which acts as the means for causing this relative movement of the pickup stylus along the path of deformable means of the record is shown symbolically by the horizontal arrow.

Figure 2:
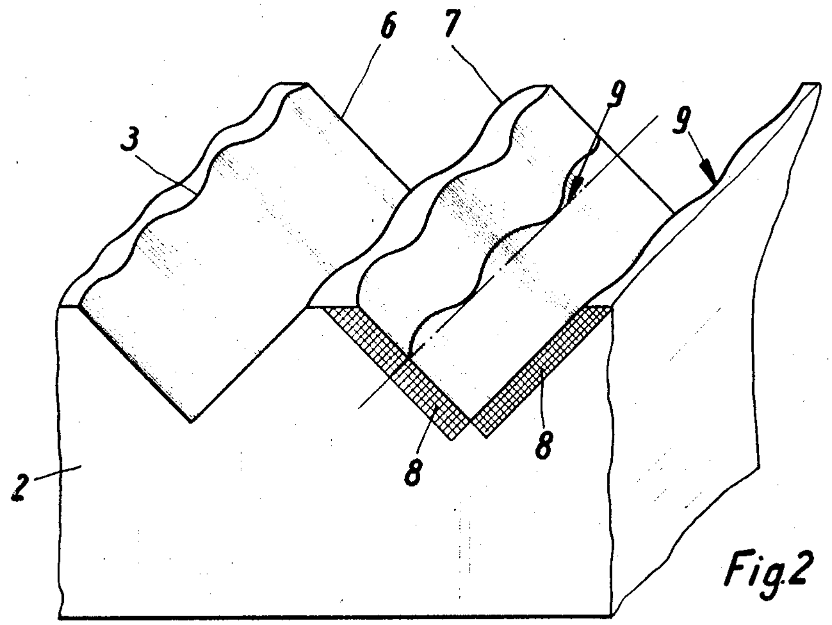
FIG. 2 is a cross-sectional and greatly enlarged detailed view of a portion of a record element according to one preferred embodiment of the present invention.
Figure 3:
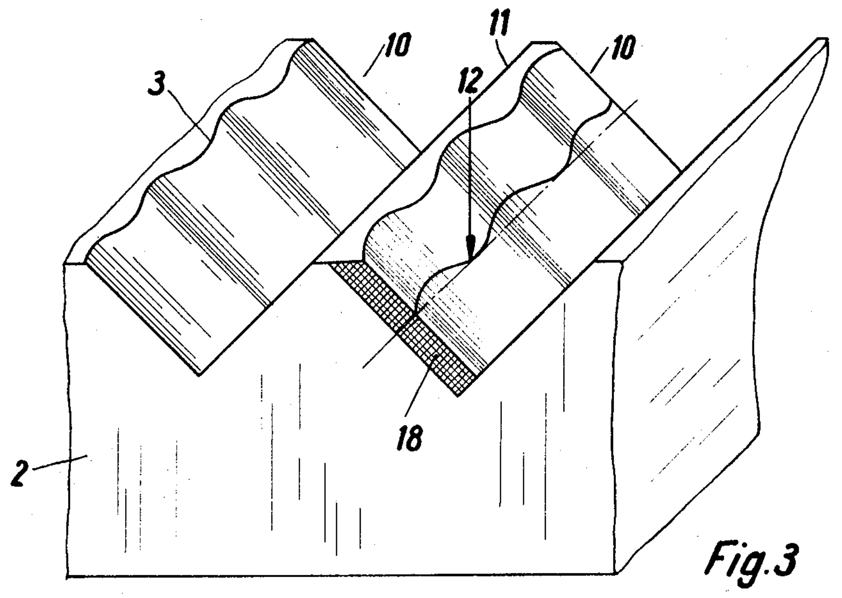
FIG. 3 is a cross-sectional and greatly enlarged detailed view of a portion of a record element according to a second preferred embodiment of the present invention.
Figure 4:
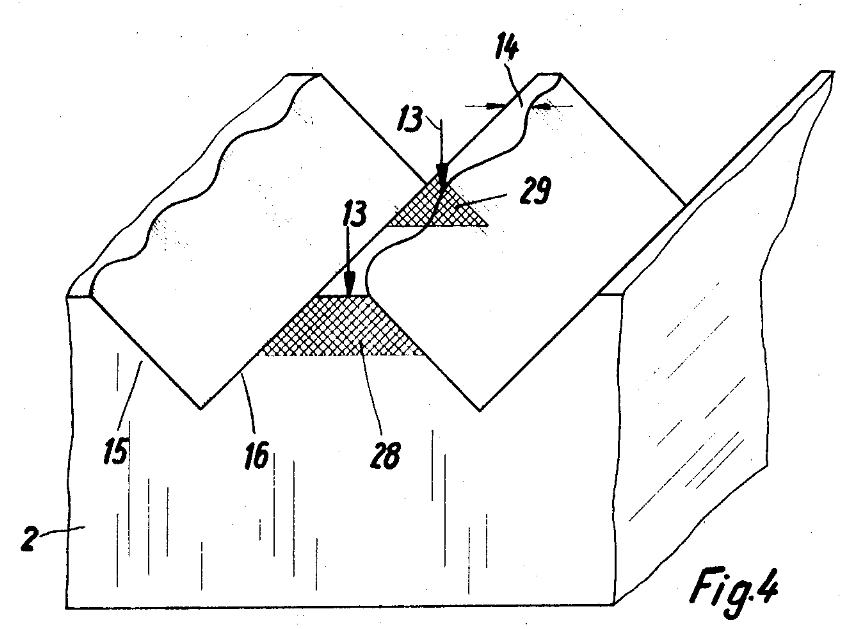
FIG. 4 is a cross-sectional and greatly enlarged detailed view of a portion of a record element according to a third preferred embodiment of the present invention.

FIGS. 2, 3 and 4 illustrate a portion of a record 2 having suitable recording grooves cut into its surface. The two sides 6 and 7 of the grooves in FIG. 2 are provided with deformations 3 in the form of wave trains. These deformations 3 are formed on the sides of the grooves by the well-known technique of vertical recording.

The portion of the record at the surface of the groove which takes part in the elastic deformations during playback is indicated by the cross-hatched layers 8. As is indicated by the arrows 9, the surface of the pickup stylus is arranged to lie against both sides of the grooves during playback.

FIG. 3 shows a portion of a record 2 similar to that of FIG. 2 which also exhibits grooves having two sides 10 and 11. However, in the embodiment illustrated in FIG. 3 only the one side 10 of the grooves is provided with deformations 3 in the from of the wave train; the side 11 is not deformed. The surface layer 18 which is indicated by the cross-hatching in the cross section of FIG. 3 illustrates that only the region below the side 10 experiences deformations when a stylus is passed through the groove during playback. The arrow 12 designates the surface with which the pickup stylus cooperates to receive the vertically oriented modulated compressive force. The embodiment illustrated in FIG. 3 can be referred to as "side modulation."

FIG. 4 is still another view of a portion of a record 2. In this embodiment the image of the signal is not formed by the amplitude of the deformations themselves, but by the width of the web 14 between the grooves which carry the deformations.

THe deformations are cut into only one side 15 of the grooves; the side 16 is allowed to remain smooth. The signal is picked up from the upper edge of the web 14 as is indicated by the arrows 13. If a pressure is applied to the barrier by the pickup stylus in the direction shown by these arrows, the cross-hatched material regions 28 and 29 will take part in the deformations. Where the web 14 is widest - e.g., above the region 28 - a larger compressive force is required to produce an elastic deformation than at the points where the web 14 is narrow - e.g., above the region 29. The compressive force which reacts upon the pickup stylus will therefore be modulated in correspondence with the width of the web. Consequently, this type of mechanical recording can be called "width modulation."

Figure 5:
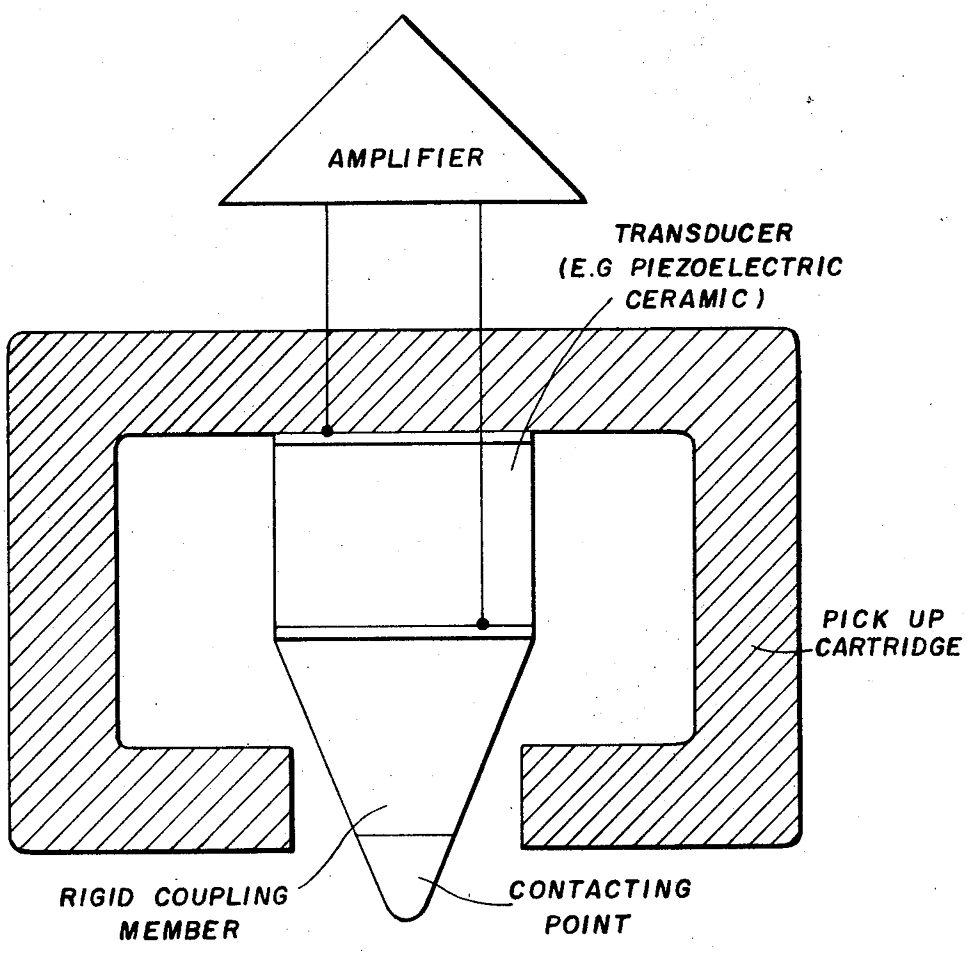
FIG. 5 is a diagrammatic view, partly in cross section, of a preferred embodiment of a pickup cartridge according to the present invention.

A particular embodiment of a pickup cartridge which employs the principle of the present invention is shown in FIG. 5. In this embodiment the contacting point or stylus does not form a part of the transducer body itself, as is the case in the embodiment of FIG. 1, but is rigidly connected to a separate pressure sensitive transducer by the coupling member shown. As is indicated in the figure, the transducer may consist of a piezoelectric ceramic which is contacted on opposite sides by metal plates. The voltages generated across the metal plates can then be supplied to a suitable amplifier having the requisite high-frequency capability.

The sound reproducing system according to the present invention is operative to pick up mechanically recorded signals which have a frequency far above the frequency limit of the signal reproducing systems of the prior art which require the movement of a stylus. This fact, which has been verified by experiment, may be explained as follows:

When a pickup device of the type common in the prior art is employed to sense mechanically recorded deformations or undulations that correspond to signals having a frequency above a certain limit, the pickup stylus will not be able to faithfully follow these deformations. The record material will be too soft to exert a force on the stylus sufficient to accelerate - that is to overcome the inertia - of the stylus and the member rigidly coupled thereto that holds the stylus. Since these conventional pickup devices produce an output signal only when the stylus is subjected to movements of substantial amplitude, the proper reproduction of stored signals at frequencies higher than this so-called limit frequency is, even in theory, impossible.

However, when the stylus of such a conventional pickup device is nevertheless subjected to such deformations which represent signals above the limit frequency, these deformations in the groove walls do exert forces on the stylus which correspond to the recorded signal. Due to the high compliance of the movable members of the pickup, these forces remain relatively small; too small, as noted above, to drive these movable members with sufficient amplitude to produce an electrical signal.

In the system according to the present invention it is these signal modulated forces produced by the action of the deformations upon a rigid pickup surface which are employed to generate the output signal. The output signal is thus produced by the surface of the record as from a mechanical generator of large internal resistance; i.e., a generator which can produce only very small movements (current) but comparatively large forces (voltage). The mechanical energy is correspondingly received by a pickup with a large input resistance, which includes as a transducer body to convert the time dependent compressive forces into modulated electrical signals. Such pressure-sensitive transducers may be realized, for example, by magnetostrictive or piezomagnetic transducers or by pressure-sensitive semiconductor elements.

The basic difference between the signal reproducing system according to the present invention and the systems of the prior art, therefore, is that the pickup surface of the pressure-sensitive transducer (or, if such is the case, the surface of a member rigidly coupled with this transducer) is not subjected to movements of any substantial amplitude. The compliance of the pickup transducer is made very low in comparison with the pickups of the prior art, and, in general, considerably lower than that of the record material. With this type of mechanically rigid pressure-sensitive system, even small changes in the compressive forces between stylus and record - changes caused by deformations in the surface of the record that are considerably smaller than those deformations representing the signal - will be sufficient to produce an electrical output voltage.

Whereas the signal reproducing systems of the prior art can be represented ideally as constituting a completely rigid record material and a pickup stylus having no mass and infinite compliance, the relationships in the system according to the present invention are, in part, just the opposite. The pickup stylus can be visualized as a nearly rigid body having contact surfaces which remain in a constant spatial relationship with the average or undeformed position of the groove walls. With the present invention, therefore, the compliance can be said to be predominantly localized in the record surface.

According to a preferred embodiment of the present invention the record element material is made sufficiently elastic, compared to the compliance of the contact surfaces of the pickup device to permit elastic deformations of the record surface during playback of substantially greater amplitude than the deflections of the pickup.

When the signal reproducing signal system according to the present invention is in operation, the record surface, which is provided with deformations, is moved past the contact surface of the pickup device. This contact surface (which, in the first approximation, can be considered stationary) continually exerts a compressive force on the record surface which forms the mechanical "bias" of the system. As elemental areas of the deformations, which, as noted above, can be viewed as large numbers of projections extending from an undeformed record surface, pass beneath and come in contact with the pickup surface, they are elastically deformed by the pickup surface so that, during, a short period, the position of their surfaces will coincide with the position of the pickup surface. This action result in an increase of the compressive forces acting on the pickup surface. Conversely, when the pickup surface passes over a portion of the record surface exhibiting recesses instead of projections, the compressive forces acting on the pickup surface will be reduced. If the mechanical bias - i.e., the compressive force applied by the pickup surface in absence of deformations in the record surface - is properly chosen, the pickup surface will remain in contact with the record surface as it encounters even the deepest recesses in the latter so that the reactive compressive forces will never be allowed to drop to zero.

The present invention therefore makes use of the incremental compressive forces due to the elastic deformations of the record material to modulate the pressure-sensitive pickup device. As a result, the present invention makes possible the reproduction of signals having a broad, continuous frequency spectrum that extends far above the frequency limits applicable to the signal reproduction systems of the prior art. In particular, the present invention makes possible the mechanical storage and reproduction of signals having frequencies of up to several megahertz (MHz.) so that even television picture and sound signals may be mechanically recorded on a record disc-type storage element.

The characteristic or resonant frequency of the transducer body is preferably set in the vicinity of the upper frequency limit of reproduction. Transducer bodies which are presently available in the form of short pressure-responsive resonators - and not even designed for the purpose they serve in the present invention - may already achieve sufficiently high frequencies. Since, as a result of the large internal resistance of the "generator" (that is, the record material), the damping is large, the inherent resonance of the transducer body will not result in any great magnification of the amplitude of the output signal.

The deformation suffered by the record material during pickup should lie preferably within the elastic limits of the material. The closer to this ideal the record element comes in practice, the less will be the wear. According to a preferred feature of the record element of the signal reproducing system of the present invention, therefore, the material and the dimensions of its signal-storing deformations are chosen so that, given the particular intended pickup speed, the material displacement at the record surface will remain substantially within the elastic limits of the record material. The pickup speed is important, in this connection, because, as is well known, a number of materials - particularly synthetically produced plastics based on copolymers of vinyl and chloride acetates - exhibit a load time-dependent yield point. That is, momentary loads which many times exceed the maximum acceptable loads of longer duration may be accepted within the elastic limits of the material.

Since it is clearly desirable to minimize the wear of the record element, the compressive force applied by the pickup stylus against such a record should be kept to a minimum, so that, at the particular pickup speed provided, it will not cause the undesirable permanent deformations of the record surface. The rule applicable to the record material and the dimensions of the deformations recorded on the surface thereof which represent the signal is that the "projections" of these deformations should be dimensioned in height and cross-sectional area, given the physical properties of the particular record material, so that these projections can absorb the contact force of the pickup stylus through elastic deformations. In other words, the record material should allow itself to be pressed together and leveled beneath the contact force of the pickup stylus without straining even the highest ones of the projections.

From a consideration of the mechanical interaction of the deformations of the record surface with the contacting surface of the pickup stylus, assuming a constant modulus of elasticity for the record material, it may be seen that the amplitude of the incremental or modulating force is not only determined by the height of the deformations in the direction of the applied force but also by the area of the lateral or transverse section of the deforming elements which carry the stylus. Because of this fact, it is possible to modulate the compressive force acting on the stylus through elastic deformations of the record material by varying the height of the deformation elements on the record surface; varying the area of the supporting cross section or also by simultaneously varying both of these quantities along the pickup path in correspondence with the time behavior of the signal to be stored.

One embodiment of the present invention for varying the supporting cross section of the deformation elements has been discussed above in connection with FIG. 4. In this embodiment the material web between two successive grooves is of constant height; however, the deformations within each groove vary the width of the web in correspondence with the value of the stored signal. When the contact surface of the pickup stylus passes over the upper surface of the material web, the variations in the web width result in corresponding variations in the compressive force applied to the pickup surface.

Another embodiment of the present invention in which the incremental compressive force applied against the pickup stylus is varied by varying the supporting cross section involves the technique of recording whereby the deformation elements exhibit different lengths in the direction of relative motion between the interacting - record and stylus - surfaces. With this technique of writing the width of the supporting cross-sectional area can either be kept constant or can also be varied along the pickup path.

The technique of writing just described, wherein the length of the deformation elements is varied along the pickup path, is preferably utilized in conjunction with a modulated-carrier type of recording. In this case, the signal to be stored is used to modulate a carrier signal and the resulting signal is mechanically recorded on the record element. The resulting recorded deformation elements may thus be viewed, along the pickup path, as a physical representation of a pulse-width modulated signal with the spatial distance between the leading edges of successive ones of the deformation element constituting the period or, inversely, the frequency of the carrier signal. As with pulse-width modulation, the stored signal is represented by the variations in length of the deformation elements and can be directly sensed by the pickup device through the variations in amplitude of the incremental compressive force.

A pickup device which is especially suited for sensing this type of recording is constructed as shown in FIG. 1 with its contact surface extending a distance in the direction of the pickup path which is greater than the longest recorded wavelength. A cross section through the sensing stylus taken along the same direction and perpendicular to the surface of the record exhibits an unsymmetrical boundary curve. That is, the front and rear sides of the stylus extend upward from the surface of the record with differing steepness. When the sensing stylus is constructed in this way, so as to continuously contact a plurality of peaks of the individual deformation elements, the record wear is reduced. The compressive force against the contacting pickup surface is then proportional to the instantaneous value of the sum of the forces produced by the individual deformation elements.

Given the assumption, mentioned above, that in the direction of pickup travel the pickup stylus is in contact with the record surface over a distance which is greater than the greatest recorded wavelength, the resulting incremental compressive force will be larger, the greater the unsymmetry of the stylus sides. The resulting force will also be at a maximum when the rear side is made infinitely steep so that, if possible, this side should form an angle with the record surface of 90°. Angles which are greater than 90° also lead to the same result.

It has already been noted that the conventional pickup devices that are presently used produce an electrical output signal that is proportional to the instantaneous value of the speed of movement of the pickup stylus. In order to produce output signal amplitudes which are independent of frequency (i.e., to obtain a "flat" response), this proportionality requires that the amplitude of the signal-representing deformations on the record be inversely proportional to frequency. For low frequencies this results in undesirably high recorded amplitudes.

The system according to the present invention for recording and reproducing signals avoids this disadvantage. With the system according to the present invention the instantaneous value of the electrical output signal is linearly dependent upon the amplitude of the recorded signal, whether the latter is expressed by the height or by the contacted cross-sectional area of the elemental deformations in the record surface. The compressive force acting on the pickup device is proportional to the amplitude of the recording and inversely proportional to the wavelength so that the recording and reproduction of low frequencies can be effected without compromise or distortion. More particularly, the increase in groove width, which is required with these systems of the prior art when recording low frequencies, can be avoided with the recording system according to the present invention so that, given a constant signal amplitude, the amplitude of the deformations in the record surface can be made substantially independent of the recorded frequency.

The dependence of the signal-producing incremental compressive force applied against the pickup stylus upon the wavelength of the recorded signal makes it possible to record the low frequencies with a lower amplitude or smaller groove width than was possible with the systems of the prior art. Not only can the distance between successive grooves be reduced, but this fact makes it also possible to achieve a recording wherein, at constant signal amplitude, the amplitude of the deformations in the record surface is approximately proportional to the frequency of the recorded signal. As a result, the groove width and the distance between successive grooves of a record can be made proportional to the recorded frequency.

The type of recording formed by the record surface can cause the modulated compressive force to be applied to the pickup device not only perpendicular but also in directions parallel or at a slant with respect to the surface of the unwritten record element, thus employing correspondingly different forms for the deformation elements. A technique of recording which is proven and which may be employed in a simple manner for the purposes of the system according to the present invention is the vertical groove recording technique illustrated in FIG. 2.

In conclusion, it is noted that the signal-recording and reproduction system according to the present invention provides for time-dependent changes in the compressive forces acting on the pickup device by recording suitable deformations in the surface of the record element. If the recorded signal is directly represented by the deformations - that is, with the value of the recorded signal describable by the same mathematical function with the spatial coordinates extending along the path of the groove as the intended signal with respect to time - the changes in the compressive force will, in the ideal case absent distortion, be a true and direct reproduction of the changes in the signal with respect to time.

If the signal recorded is an amplitude-modulated carrier signal and the contact surface of the pickup device is made longer than a plurality of wavelengths of the carrier signal but shorter than the shortest wavelength of the amplitude-modulating signal, the incremental variations in the compressive force applied to the pickup surface will follow the excursions of only the amplitude-modulating signal. In other words, the amplitude-modulating signal will be filtered from the carrier signal during the signal pickup process.

If, on the other hand, a frequency-modulated carrier signal is recorded on the record element surface, the variations in the compressive force acting on the pickup surface will likewise represent a frequency-modulated carrier signal. In order to re-obtain the modulating signal, the electrical output signal must be frequency-demodulated using suitable electronic apparatus of the type well known in the art.

It will be understood that the above description of the present invention is susceptible to various modifications, changes and adaptations.

What is claimed is:

1. In combination:

a. a carrier having deformable means by which signals are stored in mechanical form, said deformable means being arranged along a path;

b. pressure-sensitive pickup means capable of converting changes in mechanical pressure into electrical signals, said pickup means having a surface portion for engaging said deformable means; and c. means for causing relative movement of said pickup means along said path and for maintaining said surface portion of said pickup means and said deformable means in engagement with each other while said surface portion of said pickup means is maintained substantially immovable in the direction of the force acting to maintain said surface portion of said pickup means and said deformable means in engagement with each other, in consequence of which when there is relative movement of said pickup means along said path, said deformable means are deformed and said pickup means put out electrical signals which correspond to the signals that are stored in mechanical form.

2. The combination defined in claim 1, wherein said pressure-sensitive pickup means include a transducer body, said surface portion of said pickup means being constituted by a surface of said transducer body.

3. The combination defined in claim 1, wherein said pressure-sensitive pickup means include a transducer body and a contact element rigidly coupled to said transducer body, said surface portion of said pickup means being constituted by a surface of said contact element.

4. The combination defined in claim 1, wherein said deformable means of said carrier are constituted by a series of projections extending from the surface of said carrier, and wherein the height of said series of projections measured along the direction of said force which maintains said surface portion of said pickup means and said deformable means in engagement with each other varies along said path of said relative movement of correspondence with the signals stored in the respective projections.

5. The combination defined in claim 1, wherein said deformable means of said carrier are constituted by a series of projections extending from the surface of said carrier, and wherein the area of said surface of said projections against which there is applied said force which maintains said surface portion of said pickup means and said deformable means in engagement with each other varies along said path of said relative movement in correspondence with the signals stored in the respective projections.

6. The combination defined in claim 1, wherein said deformable means are constituted by a continuous web having an upper surface extending along said path, said upper surface of said web being contacted by said surface portion of said pickup means, the width of said web varying along said path of said relative movement in correspondence with the signals stored in said web.

7. The combination defined in claim 1, wherein said pressure-sensitive pickup means include a piezoelectric transducer.

8. The combination defined in claim 1, wherein said pressure-sensitive pickup means include a magnetostrictive transducer.

9. The combination defined in claim 1, wherein said pressure-sensitive pickup means include pa pressure-sensitive semiconductor element.

10. The combination defined in claim 1, wherein said deformable means of said carrier are constituted by a series of projections extending from the surface of said carrier, and wherein said surface portion of said pickup means extends a distance, in the direction of said relative movement, which is greater than the maximum distance between any two consecutive ones of said series of projections.

11. The combination defined in claim 1, wherein said surface portion of said pickup means has a front side and a rear side, the edge of said front side and the edge of said rear side formed by a cross section through said surface portion taken perpendicular to the surface of said carrier and in the direction along said path of said relative movement being of unequal steepness with respect to said surface of said carrier.

12. The combination defined in claim 1, wherein said deformable means of said carrier are constituted by a series of projections extending from the surface of said carrier, and wherein each of said series of projections corresponds to a carrier signal which is amplitude modulated by the signal stored in the respective projection.

13. The combination defined in claim 1, wherein said deformable means of said carrier are constituted by a series of projections extending from the surface of said carrier, and wherein each of said series of projections corresponds to a carrier signal which is frequency modulated by the signal stored in the respective projection.

14. The combination defined in claim 1, wherein at least the portion of said carrier which constitutes said deformable means thereof is made of a material of such composition that said force which maintains said surface portion of said pickup means and said deformable means in engagement with each other effects a deformation thereof which is substantially greater than the movement which said surface portion of said pickup means undergoes upon reaction to the deformation of said deformable means.

15. The combination defined in claim 14, wherein said material and the dimensions of said deformable means are so chosen that the deformation of said material caused by said surface portion of said pickup means, for a given speed of said relative movement, will lie substantially within the elastic limit of said material.

16. The combination defined in claim 1, wherein said deformable means of said carrier are constituted by a series of projections extending from the surface of said carrier, and wherein the amplitude of each of said series of projections, for a given amplitude of the signal stored in each respective projection is substantially independent of the frequency of such stored signal.

17. The combination defined in claim 16, wherein said series of projections are arranged in substantially parallel grooves in the surface of said carrier, the distance between center lines of adjacent ones of said grooves being substantially constant over the length of said grooves.

18. The combination defined in claim 1, wherein said deformable means of said carrier are constituted by a series of projections extending from the surface of said carrier, and wherein the amplitude of each of said series of projections, for a given amplitude of the signal stored in each respective projection, is approximately proportional to the frequency of such stored signal.

19. The combination defined in claim 18, wherein said series of projections are arranged in substantially parallel grooves in the surface of said storage element, the width of said grooves and the distance between the center lines of adjacent ones of said grooves being proportional to the frequency of the stored signals.

20. For use with pressure-sensitive pickup means for converting changes in mechanical pressure into electrical signals and having a surface portion, a carrier having deformable means by which signals are stored in mechanical form, said deformable means being arranged along a path over which there is to be relative movement between the pickup means and the deformable means for subjecting the pickup means to different pressures as the pickup means move along the path while in engagement with said deformable means, in consequence of which, upon such relative movement of said pickup means along the path, with the surface portion of the pickup means engaging said deformable means and with the surface portion of the pickup means remaining in substantially constant spatial relationship with the undeformed position of said deformable means, the latter are deformed and the pickup means put out electrical signals which correspond to the signals that are stored in mechanical form.

21. The carrier defined in claim 20, wherein the material of which the portion of the carrier which constitutes said deformable means thereof is made, and the dimensions of said deformable means, are so chosen that the deformation of said deformable means caused by the surface portion of the pickup means, for a given speed of the relativement, will lie substantially within the elastic limit of the material.

22. The carrier defined in claim 20, wherein said deformable means store signals which are those of a television picture.

23. The carrier defined in claim 20, said carrier being in the form of a disc.

24. The carrier defined in claim 23, said carrier having a groove forming said path and said deformable means being arranged in said groove.

25. For use with a carrier having deformable means by which signals are stored in mechanical form and which deformable means are arranged along a path, a playback device comprising, in combination:

a. means for receiving the carrier to be played back;

b. pressure-sensitive pickup means capable of converting changes in mechanical pressure into electrical signals, said pickup means having a surface portion; and c. means for causing relative movement of said pickup means along the path defined by the deformable means of a carrier received by said receiving means and for maintaining said surface portion of said pickup means in engagement with the deformable means of such carrier such that said surface portion of said pickup means remains in substantially constant spatial relationship with the undeformed portion of said deformable means, in consequence of which when there is relative movement of said pickup means along the path, the deformable means of the carrier are deformed and said pickup means put out electrical signals which correspond to the signals that are stored in mechanical form.

* * * * *

UNITED STATES PATENT OFFICE
CERTIFICATE OF CORRECTION

Patent No. 3,652,809 Dated March 28th, 1972

Inventor(s) Gerhard Dickopp, Hans-Joachim Klemp, Horst Redlich, Eduard Schuller

It is certified that error appears in the above-identified patent and that said Letters Patent are hereby corrected as shown below:

Column 3, line 73, change "from" to --form--; line 74, after "of" change "the" to --a--. Column 5, line 4, change "magnetostrictive or piezomagnetic" to --piezoelectric or magnetostrictive--; line 52, change "result" to --results--. Column 9, line 19, after "movement" change "of" to --in--.

Signed and sealed this 15th day of August 1972.

(SEAL)
Attest:

EDWARD M.FLETCHER,JR.
Attesting Officer

ROBERT GOTTSCHALK
Commissioner of Patents